United States Patent
Ingwall

(10) Patent No.: US 7,463,799 B2
(45) Date of Patent: Dec. 9, 2008

(54) TEMPERATURE COMPENSATION OF BRAGG REFLECTION GRATINGS

(75) Inventor: Richard T. Ingwall, Newton, MA (US)

(73) Assignee: STX, Aprilis, Inc., Maynard, MA (US)

( * ) Notice: Subject to any disclaimer, the term of this patent is extended or adjusted under 35 U.S.C. 154(b) by 21 days.

(21) Appl. No.: 10/166,562

(22) Filed: Jun. 10, 2002

(65) Prior Publication Data

US 2003/0007250 A1    Jan. 9, 2003

Related U.S. Application Data

(60) Provisional application No. 60/297,416, filed on Jun. 11, 2001.

(51) Int. Cl.
   *G02B 6/34* (2006.01)
(52) U.S. Cl. ............... 385/37; 359/566; 65/385
(58) Field of Classification Search ......... 385/37
   See application file for complete search history.

(56) References Cited

U.S. PATENT DOCUMENTS

| | | |
|---|---|---|
| 4,094,011 A | 6/1978 | Nagao |
| 4,138,357 A * | 2/1979 | Igarashi ............ 503/208 |
| 5,481,523 A | 1/1996 | Dewald |
| 5,519,517 A | 5/1996 | Redfield et al. |
| 5,938,811 A * | 8/1999 | Greene ............ 65/385 |
| 6,023,709 A | 2/2000 | Anglin et al. |
| 6,199,146 B1 | 3/2001 | Pence |
| 6,212,148 B1 | 4/2001 | Hesselink et al. |
| 6,322,931 B1 * | 11/2001 | Cumpston et al. ........... 430/1 |
| 6,348,983 B1 | 2/2002 | Curtis et al. |
| 6,867,888 B2 * | 3/2005 | Sutherland et al. ........ 359/15 |
| 2001/0015949 A1 * | 8/2001 | Nagase et al. ........... 369/100 |
| 2002/0119400 A1 * | 8/2002 | Jain et al. ............ 430/321 |
| 2004/0170356 A1 * | 9/2004 | Iazikov et al. ........... 385/37 |

OTHER PUBLICATIONS

Kogelnik, Herwig, "Coupled Wave Theory for Thick Hologram Gratings," *The Bell System Technical Journal*, 48(9) :2909-2947 (1969).
Orlov, Sergei S., "Volume Holographic Data Storage," *Communications of the ACM*, 43(11):46-54 (2000).
Barbastathis, G. et al., "Volume Holographic Multiplexing Methods," *Library of Congress Cataloging-in-Publication Data*, pp. 21-62.

* cited by examiner

*Primary Examiner*—David A. Vanore
*Assistant Examiner*—Phillip A. Johnston
(74) *Attorney, Agent, or Firm*—Hamilton, Brook, Smith & Reynolds, P.C.

(57) ABSTRACT

A Bragg grating that has an average index of refraction that changes with temperature to compensate for variations in grating spacing caused by temperature changes.

12 Claims, 1 Drawing Sheet

TEMPERATURE COMPENSATION OF BRAGG REFLECTION GRATINGS

RELATED APPLICATION

This application claims the benefit of U.S. Provisional Application No. 60/297,416, filed Jun. 11, 2001, the entire contents of which are incorporated herein by reference.

BACKGROUND

Bragg gratings are structures with a periodic variation in refractive index that are usually formed in optical components such as holograms, waveguides, and optical fibers. These structures reflect an incident light beam such that the reflected light has a narrow spectral bandwidth with a central wavelength. Wavelengths outside of the reflected bandwidth are transmitted without alteration.

The fraction of incident light that is reflected is determined by the magnitude of the refractive index variation and by the number of refractive index periods provided in the structure. Reflectivity greater than 99% can be obtained in Bragg structures that are only 100 µm to 300 µm thick and have refractive index changes near 0.01. This combination of high reflectivity over a narrow spectral bandwidth has several interesting applications. Bragg gratings, for example, are used in optical communication as stabilizers for pump lasers, narrowband wave division multiplexing (VDM) add/drop filters, and gain-flattening filters. Additional applications include narrow-band filters for laser protection, Raman spectroscopy, wireless optical communication, and light detection and ranging (LIDAR).

Many of these applications demand that the grating operate over a relatively wide temperature range without significant change either to its reflectivity or to its central, or Bragg, reflected wavelength. Unfortunately thermal expansion and contraction of the Bragg grating material alters the performance of the grating.

SUMMARY

The present invention implements an apparatus, for example an optical filter, and a process to minimize or eliminate termperature-induced changes in the performance of reflective, holographic Bragg gratings. The filter incorporates a special component in the grating whose refractive index changes with temperature to compensate for the change in the grating spacing caused by temperature variations. Effects resulting from temperature-induced changes in the refractive index and the grating spacing cancel to leave the performance of the Bragg grating unaffected. Particular useful compensation components include thermochromatic dyes, and molecules that undergo thermally reversible conformational changes.

In one aspect of the invention, a Bragg grating has an average index of refraction that changes with temperature to compensate for variations in grating spacing caused by temperature variations.

The Bragg grating can reflect over 99% of light, the reflected light having a central wavelength. Further, the reflected light can have a narrow spectral bandwidth of less than about 0.1% of the central wavelength.

Embodiments of this aspect can include one or more of the following features. In one embodiment, the Bragg grating includes holographic elements made of a photopolymer that contains a thermochromic dye such as bianthrone. The Bragg grating can have a thickness of about between 100 µm and 300 µm. The Bragg grating can selectively filter a portion of an incident light such that light reflected by the grating has a central wavelength and a narrow spectral bandwidth, and light transmitted by the grating has one or more wavelengths outside the central wavelength.

In some embodiments, the density of the Bragg grating, as well as the index of refraction of the grating, decreases as the temperature of the grating increases. Typically, the reflected light has a wavelength which satisfies the Bragg condition for constructive interference.

In certain embodiments, a optical filter includes one or more Bragg gratings in a manner such that each Bragg grating selectively filters light with a respective central wavelength over a respective narrow spectral bandwidth.

In another aspect, the invention features a method of compensating for temperature variations in a Bragg grating by varying an index of refraction of the Bragg grating to compensate for variation of the grating spacing caused by temperature changes.

In yet another aspect, the invention features a method which uses a Bragg grating for selectively filtering light with a central wavelength of an incoming light with two or more wavelengths, and transmitting light with wavelengths outside the central wavelength. Filtering the light also includes compensating changes in the grating spacing caused by temperature variations by varying the average index of refraction of the grating.

Among other advantages, the Bragg gratings of the present invention can be used in many applications which operate over a wide temperature range without having to use expensive temperature controlling components.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
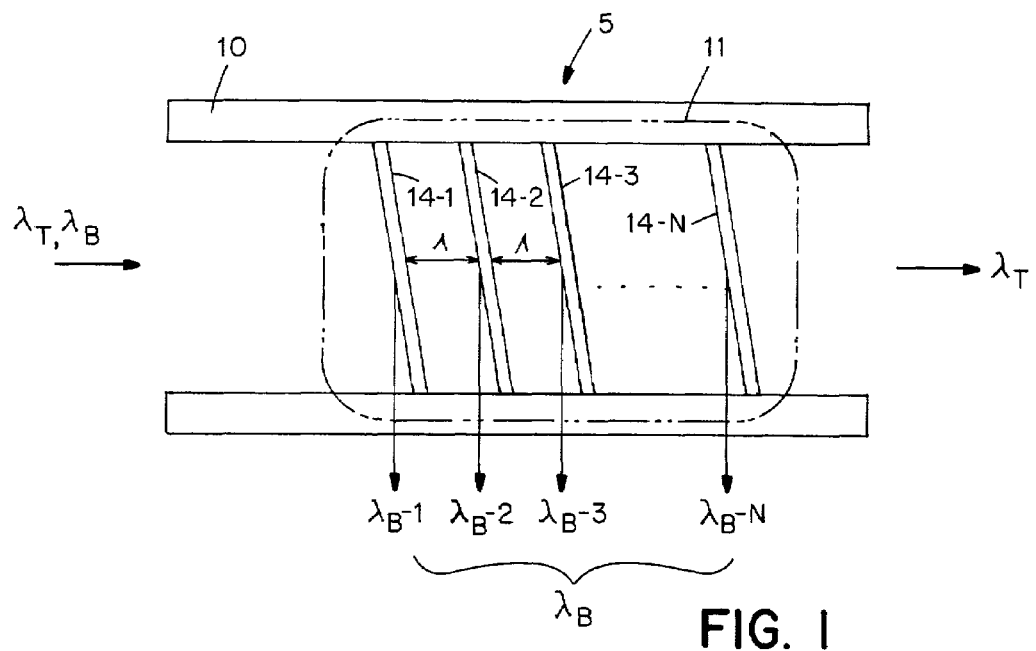
FIG. 1 is a schematic illustration of an optical filter with a Bragg grating in accordance with the invention.

Referring to FIG. 1 there is shown an optical filter 5 including a Bragg grating that filters out light with a wavelength centered at the Bragg wavelength, $\lambda_B$, and permits light with other wavelengths, identified as $\lambda_T$ to transmit through the filter. The light that transmits through the optical filter 5 can have a single wavelength or multiple wavelengths.

The optical filter 5 includes a waveguide 10 provided with a reflective Bragg grating 11. The Bragg grating is a linear and regular periodic variation of the refractive index of the waveguide. Planes of maximum refractive index are shown in FIG. 1 as features 14-1, 14-2, 14-3, ..., 14-N (collectively referred to as the grating). Each plane 14 is separated from its two immediate neighbors by a distance $\Lambda$. The optical path length between adjacent planes is, therefore, $n\Lambda$, where n is the average refractive index of the grating. As such, the Bragg grating 10 reflects a narrow spectral bandwidth of light with a central wavelength, $\lambda_B$, according to the Bragg condition for constructive interference:

$$\lambda_B = 2n\Lambda$$

Figure 2:
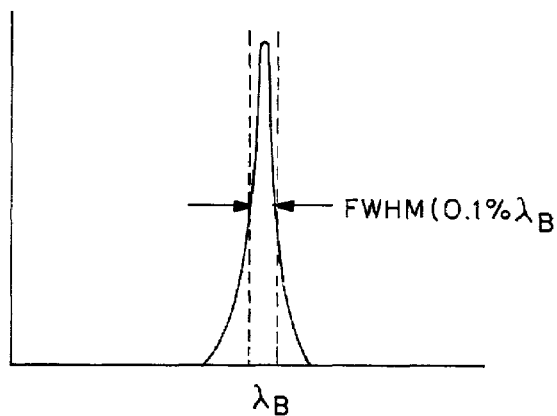
FIG. 2 is a diagram illustrating the bandwidth of the light reflected by the filter of FIG. 1.

That is, each of the planes 14-1, 14-2, 14-3, . . . , 14-N reflects a portion $\lambda_B$-1, $\lambda_B$-2, $\lambda_B$-3, . . . , $\lambda_B$-N, respectively, of the light with the central wavelength $\lambda_B$. The Bragg condition is met when these portions are in phase and add constructively. At the Bragg condition, almost all (over 99%) of the light with a wavelength of $\lambda_B$ is filtered to permit light with only a wavelength of $\lambda_T$ to transmit through the optical filter 5. The optical filter 5 is able to filter light with a wavelength $\lambda_B$ that has a spectral bandwidth of less than about 0.1% $\lambda_B$, full width half maximum (FWHM), as illustrated in FIG. 2. Thus, a 300 µm thick Bragg grating 11, for example, with a reflectivity greater than 99% for a Bragg wavelength at about $\lambda_B$=500 nm has a spectral bandwidth that is less than 0.5 nm, FWHM. Typically, as the difference between $\lambda_B$ and $\lambda_T$ decreases, the number of grating planes required to reflect $\lambda_B$ increases. The spectral bandwidth of the reflected light decreases as the number of refractive index periods increases.

In use, the optical filter described above is typically subjected to temperature variations, such as, for example, 0° C. to 40° C. The present invention minimizes or eliminates changes in 2n$\Lambda$ $\Lambda$ with temperature by incorporating a special component, described in detail below, in the grating 14 whose refractive index changes with temperature to compensate for the change of the grating spacing $\Lambda$ due to temperature variations.

Properties of a component that can affect the desired temperature compensation are revealed by considering the Lorentz:Lorenz equation that relates the refractive index, n, of an isotropic material to its density and electronic structure:

$$\frac{n^2 - 1}{n^2 + 2} = \frac{\rho R}{M} \quad \text{(Eq. 1)}$$

where $\rho$ is the density, R the molar refraction, and M the molecular weight of the material that forms the Bragg grating.

The molar refraction of a compound is determined by its constituent atoms and the nature of their bonding. The derivative of n with respect to the temperature t can be determined from Eq. 1 by assuming both $\rho$ and R vary with t. Thus, $$\frac{dn}{dt} = \frac{(n^2+1)(n^2-1)}{6n}\left\{\frac{1}{R}\frac{dR}{dt} + \frac{1}{\rho}\frac{d\rho}{dt}\right\} \quad \text{(Eq. 2)}$$

The Bragg wavelength can also be differentiated with respect to t, yielding $$\frac{d\lambda}{dt} = \frac{d(2n\Lambda)}{dt} = 2n\frac{d\Lambda}{dt} + 2\Lambda\frac{dn}{dt} \quad \text{(Eq. 3)}$$

By assuming isotropic thermal expansion and contraction, the change in grating spacing $\Lambda$ with temperature is related to the volume thermal expansion coefficient of the material. With these considerations in mind, $$\frac{d\Lambda}{dt} = \frac{-\Lambda d\rho}{3\rho dt} \quad \text{(Eq. 4)}$$

and a simple expression for the change in the central wavelength $\lambda_B$ with temperature is established. Setting Eq. 3 to zero, the condition that $\lambda_B$ be independent of temperature leads to the equation $$\frac{1}{R}\frac{dR}{dt} = -\left[1 - \frac{2n^2}{(n^2+2)(n^2-1)}\right]\frac{1}{\rho}\frac{d\rho}{dt} \quad \text{(Eq. 5)}$$

upon substituting Eqs. 2 and 4 into Eq. 3.

Since $1-2n^2/\{(n^2+2)(n^{2-1})\}$ is positive for values of n greater than 1.4, the molar refraction R must increase with temperature in order to produce a temperature independent $\lambda_B$. By substituting a representative value for the thermal expansion coefficient of a glassy polymer, and by using a value of n=1.5, an example of a typical molar refraction change is found to be $$\frac{1}{R}\frac{dR}{dt} \approx \frac{3.5 \times 10^{-5}}{K°} \quad \text{(Eq. 6)}$$

Tabulated molar refraction values for organic structural units suggest that relatively small changes in molecular structure can meet the requirement to stabilize $\lambda_B$.

Classes of compounds with positive values of dR/dt include thermochromic dyes, and molecules that undergo thermally reversible conformational changes. Certain thermochromatic dyes such as bianthrones

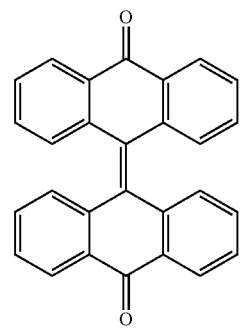

are particularly useful for this application.

Upon heating these dyes, a pronounced electronic absorption band develops in the red or near infrared spectral region. There is an associated increase in refractive index, and molar refraction for the spectral regions useful in telecommunications. The thermochromic effect is reversible so that repeated temperature cycling can be accommodated.

Temperature compensating compounds are particularly useful for the construction of Bragg gratings in photopolymer recording systems. They are incorporated in the recording formulation before the holographic exposure that is used to produce the grating. The amount to be incorporated is chosen to provide the desired amount of molar refraction change with temperature. Two or more compensating components can be used to provide the proper temperature compensation range at the required wavelength. The resulting grating would have an extended temperature operating range without the added cost and complexity of an active temperature compensation system.

In certain embodiments, the filter 5 includes a polymer waveguide 10 on a glass substrate. In some of these embodiments, the waveguide 10 can have a thickness of between about 2 µm to 10 µm, a width between about 100 µm to 5000 µm, and a length between about 0.5 cm to 10 cm. The length of the Bragg grating 11 along the length of the waveguide 10 can be between about 0.1 mm to 10 mm, and the fringe spacing of the gratings can be between about 400 nm to 550 nm. For some gratings, the refractive indices can be between about 1.4 to 1.6, and the central wavelength can be between about 1310 nm to 1550 nm.

In the illustrated embodiment, the optical filter 5 is arranged to filter light with a wavelength $\lambda_B$. However, in other arrangements, the optical filter 5 can filter light with multiple wavelengths.

Figure 3:
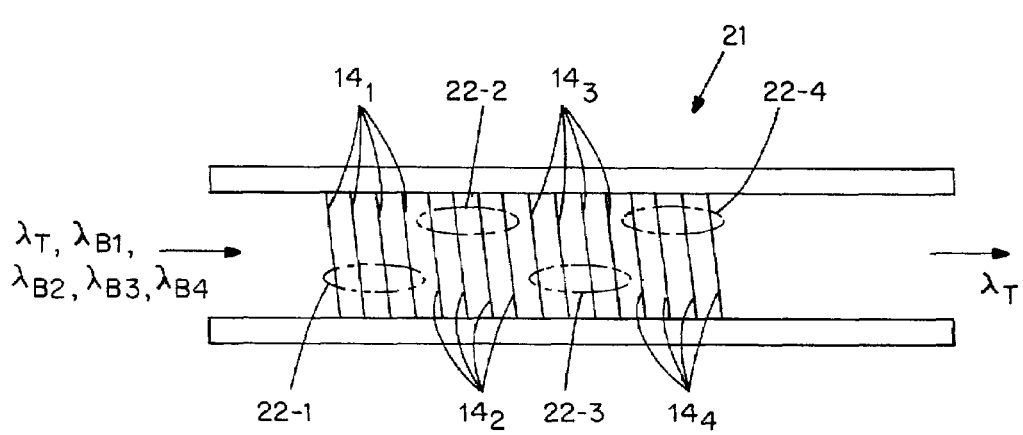
FIG. 3 is an alternative embodiment of an optical filter with a Bragg grating in accordance with the invention.

For example, there is shown in FIG. 3 a waveguide 20 of an optical filter 21 provided with multiple Bragg gratings 22-1, 22-2, 22-3, and 22-4 (collectively referred to as Bragg grating 22). Each of the Bragg gratings 22-1, 22-2, 22-3, and 22-4 includes multiple grating planes $14_1$, $14_2$, $14_3$, and $14_4$, respectively, as described in the above discussion.

As such, each Bragg grating 22 removes light with a particular wavelength of incoming light. For example, if the incoming light has wavelengths of $\lambda_T$, $\lambda_{B1}$, $\lambda_{B2}$, $\lambda_{B3}$, and $\lambda_{B4}$, then the Bragg gratings 22-1, 22-2, 22-3, and 22-4 filter light with central wavelengths $\lambda_{B1}$, $\lambda_{B2}$, $\lambda_{B3}$, and $\lambda_{B4}$, respectively, and light with a wavelength $\lambda_T$ transmits through the optical filter 21 without alteration.

While this invention has been particularly shown and described with references to preferred embodiments thereof, it will be understood by those skilled in the art that various changes in form and details may be made therein without departing from the scope of the invention encompassed by the appended claims.

What is claimed is:

1. A device comprising
   a photopolymer, said photopolymer including a thermochromic dye; and
   a Bragg grating recorded as a holographic element in said photopolymer, wherein said photopolymer has an average index of refraction which changes with temperature to compensate for variations in the grating spacing caused by temperature variations.

2. The device of claim 1, wherein the thermochromic dye is bianthrone.

3. The device of claim 1, wherein greater than about 99% of the light with a central wavelength is reflected by the Bragg grating.

4. The device of claim 1, wherein the Bragg grating has a thickness of about between 100 µm and 300 µm.

5. The device of claim 1, wherein the density of the Bragg grating decreases as the temperature of the grating increases.

6. The device of claim 5, wherein the index of refraction of the thermal compensating component increases as the temperature increases.

7. The device of claim 1, wherein light reflected by the Bragg grating has a wavelength which satisfies the Bragg condition for constructive interference.

8. The device of claim 1, wherein light reflected by the Bragg grating has a spectral bandwidth that is less than about 0.1% of a central wavelength, full width half maximum.

9. The device of claim 1, wherein the Bragg grating selectively filters light by reflecting light with a central wavelength having a narrow spectral bandwidth, and transmitting light with one or more wavelengths outside the central wavelength.

10. An optical filter comprising the device of claim 1.

11. The optical filter of claim 10, further comprising one or more additional Bragg gratings, each Bragg grating selectively filtering light with a respective central wavelength over a respective narrow spectral bandwidth.

12. A method of manufacturing a device that includes a Bragg grating, comprising:
    incorporating into a photopolymer a thermochromic dye; and recording a Bragg grating in said photopolymer.

* * * * *